United States Patent [19]

Fitch

[11] Patent Number: 5,361,389
[45] Date of Patent: Nov. 1, 1994

[54] APPARATUS AND METHOD FOR EMULATION ROUTINE INSTRUCTION ISSUE

[75] Inventor: Jonathan Fitch, Cupertino, Calif.

[73] Assignee: Apple Computer, Inc., Cupertino, Calif.

[21] Appl. No.: 127,254

[22] Filed: Sep. 27, 1993

[51] Int. Cl.$^5$ .......................... G06F 9/38; G06F 9/455
[52] U.S. Cl. .................. 395/375; 364/262.4; 364/946.2
[58] Field of Search ........................ 395/375, 775, 800

[56] References Cited

U.S. PATENT DOCUMENTS

| | | | |
|---|---|---|---|
| 4,003,033 | 1/1977 | O'Keefe | 395/375 |
| 4,179,737 | 12/1979 | Kim | 395/375 |
| 4,791,557 | 12/1988 | Angel et al. | 395/375 |
| 4,847,753 | 7/1989 | Matsuo | 395/375 |
| 4,894,772 | 1/1990 | Langendorf | 395/375 |

*Primary Examiner*—David Y. Eng
*Attorney, Agent, or Firm*—Greg T. Sueoka

[57] ABSTRACT

An apparatus for emulation routine instruction issue comprises a bus signal router, a state machine, a virtual program counter (VPC) circuit, an emulated program counter (EPC), a summing circuit, an opcode storage register, and a pointer storage register. The VPC circuit maintains the VPC value under the direction of the state machine. In response to a next instruction request issued by the central processing unit (CPU), the state machine outputs the VPC to an instruction address bus, transferring the host instruction stored at the address indicated by the VPC to the instruction bus for issue to the CPU. After a next host instruction request, the state machine updates the VPC value. Concurrent with the execution of the current emulation routine, the state machine prefetches the nest emulation routine pointer (NERP) by issuing DMA commands and commands to the EPC, the opcode storage means, and the pointer storage means. If the final host instruction in the current emulation routine has been reached, the state machine assigns the NERP to the VPC and outputs the VPC to the instruction address bus. A method for Emulation Routine Instruction Issue comprises the steps of determining if a next host instruction request has been made by the CPU; outputting the VPC to the instruction address bus; and updating the VPC; and prefetching the NERP concurrent with the execution of the host instructions in the current emulation routine.

26 Claims, 7 Drawing Sheets

APPARATUS AND METHOD FOR EMULATION ROUTINE INSTRUCTION ISSUE

CROSS-REFERENCES TO RELATED APPLICATIONS

The present invention relates to U.S. patent application Ser. No. 08/124,315, entitled "Apparatus and Method for Emulation Routine Pointer Prefetch," filed on Sep. 20, 1993; and U.S. patent application Ser. No. 08/125,940, entitled "Apparatus and Method for Emulation Routine Control Transfer via Host Jump Instruction Creation and Insertion," filed on Sep. 23, 1993.

BACKGROUND OF THE INVENTION

1. Field of the Invention

The present invention relates generally to computer instruction emulation, and more particularly to an apparatus and method for accelerating instruction emulation. Still more particularly, the present invention is an apparatus and method for issuing emulation routine instructions during the emulation of a source instruction program.

2. Description of the Background Art

Microprocessors execute machine instructions that result in specific changes of state within the microprocessor hardware. A collection of such instructions, when properly arranged, is known as a program. Execution of a program's instructions in sequence performs a series of state changes that results in useful work, such as adding a column of figures.

Many computer architectures exist, each of which understands a specific and typically unique set of machine instructions or "language." Therefore, a program written for one architecture is useless and incomprehensible to another architecture. Since programs can require a tremendous investment of time and resources to write (hundreds of man years of skilled labor in some cases), and are limited to a single architecture, it is desirable to have a means to translate the program from one language to another. Such a translator would allow the investment made in writing programs for one architecture to be retained for writing the same program on other architectures.

Three broad solutions to the problem of architecture-specific program execution exist. These are static recompilation, dynamic recompilation, and interpretive emulation. In each case, an emulation program is written, usually on the alternative or host architecture, that translates a sequence of source program instructions intended for the source or emulated architecture into one or more instructions in the host's instruction language that perform the same function. The emulation program can be written to simulate the actions of each source program instruction individually, or to simulate the actions of several source program instructions in a single step. In general, simulation of each source program instruction individually provides greater emulation accuracy at the expense of execution speed.

In static recompilation, the emulated program is swept through in its entirety prior to execution and translated to a host program. The host program is then executed. This is rarely a complete solution since most programs exhibit dynamic behavior that cannot be predicted statically. For example, a branch instruction may depend upon a result computed by previous instructions that cannot be predicted prior to running the program. Therefore, the branch instruction cannot be translated to its meaningful counterparts in the host's language. Static recompilation also suffers from the shortcoming of requiring significant amounts of memory to store the translated copy of the program. In addition, static recompilation requires a complete understanding of the behavior of all possible programs. Thus, static recompilation is not a complete solution to effectively translating computer programs for emulation.

Dynamic recompilation allows emulation of programs that exhibit dynamic behavior such as branch instructions. In dynamic recompilation, programs are statically translated until a problem instruction (usually a branch) that cannot be accurately translated is reached. The translated program is then executed up to this point such that the architectural state of the emulated machine is updated. The problem instruction can then be emulated by the execution of an emulation routine corresponding to the problem instruction, after which static translation can begin again. This method can successfully emulate any program and is efficient if large sections of source instructions can be statically translated. However, the translator must run concurrently with the emulated program, and adds significant overhead to the emulation process. The speed and memory requirements are difficult to predict, and will vary greatly depending upon the character of the emulated program.

Interpretive emulation emulates each source instruction as a separate entity. Interpretive emulation provides an architecturally distinct state at each emulated source instruction boundary, and has the potential of being the most accurate and interactive of the three emulation techniques. Interpretive emulation typically has a predictable and potentially small memory requirement, since no translated copy of the program need be stored. However, interpretive emulation can be the slowest method, requiring many more host instructions to emulate a given source instruction as compared to either static or dynamic recompilation.

Interpretive emulation is the most desirable emulation technique in terms of emulation accuracy and robust performance; unfortunately, it is typically the slowest emulation technique. The most straightforward method of implementing an interpretive emulator is to employ a dispatch loop within the emulator to fetch a source instruction from the source program stream, and to use the binary value of the operation code within the source instruction to index a table in memory. The value of the table entry, referred to as a "pointer," is the address of an emulation routine consisting of host instructions that implement the architectural changes of state required to emulate the original source instruction. The dispatch loop issues a jump to the address indicated by the pointer, after which the emulation routine is executed. The final host instruction within the emulation routine returns control to the dispatch loop, which fetches the next source instruction from the source program.

The prior art interpretive emulator suffers from two major performance problems. The first major performance problem is that no emulation actually occurs during the set of operations performed within the dispatch loop. The overall emulation of any given source instruction can be partitioned into two time intervals. The first time interval is that required to complete the operations performed within the dispatch loop, and the second time interval is that required to complete the host instructions comprising the emulation routine. Each operation performed within the dispatch loop increase the overall time required to emulate any given source instruction. The execution of two operations within the dispatch loop that rely upon results being returned from memory particularly increases the overall emulation time. If the data targeted by either of these operations does not reside within a cache, either of these operations can take longer to execute than an entire emulation routine.

The second major performance problem occurs as a result of the two branch instructions required for each source instruction's emulation. That is, one branch instruction is executed in the jump to the emulation routine, and another branch instruction is executed when the emulation routine returns to the dispatch loop. While branches are conceptually simple, they are difficult to efficiently implement on most microprocessors, particularly those having reduced instruction set computing (RISC) architectures. Each branch instruction significantly increases the overall time required for the emulation of any given source instruction.

What is needed is an apparatus and method for transferring control from a current emulation routine to a next emulation routine in which control is transferred from a current to a next emulation routine without the problems associated with the prior art.

SUMMARY OF THE INVENTION

The present invention is an apparatus and method for emulation routine instruction issue, in which the apparatus and method issues each host instruction required in the emulation of a source instruction program to the CPU. The apparatus and method of the present invention maintains a virtual program counter (VPC) that indicates the address of the next host instruction to be executed. During the execution of a current emulation routine, the VPC indicates the address of the next host instruction within the current emulation routine. Upon completion of the current emulation routine, the present invention updates the VPC to the address of the first host instruction in a next emulation routine. The first host instruction in the next emulation routine is then executed directly following the completion of the current emulation routine's execution. The present invention effectively translates the source instructions into a stream of host instructions, and feeds the stream of host instructions directly to the CPU by using the VPC that specifies the address of the next host instruction to be executed. Concurrent with the execution of the current emulation routine's set of host instructions, the present invention determines the address of the first host instruction in the next emulation routine by prefetching a next emulation routine pointer (NERP). The VPC is assigned the value of the NERP when the current emulation routine reaches its final host instruction.

The apparatus present invention preferably comprises a bus signal router, a state machine, VPC circuit, an emulated program counter (EPC), a summing means, an opcode storage means, and a pointer storage means. The VPC circuit maintains the VPC value under the direction of the state machine. In response to a next instruction request issued by the CPU, the state machine outputs the VPC value to an instruction address bus, thereby causing the host instruction stored at the address indicated by the VPC to be transferred to the instruction bus and therefore be issued to the CPU. After a next host instruction request, the state machine updates the VPC value. Concurrent with the execution of the current emulation routine, the apparatus of the present invention prefetches the NERP. To accomplish the NERP prefetch, the state machine issues DMA commands and commands to the EPC, the opcode storage means, and the pointer storage means. If the final host instruction in the current emulation routine has been reached, the state machine assigns the NERP to the VPC and then outputs the VPC to the instruction address bus.

The method of the present invention preferably comprises the steps of: determining if a next host instruction request has been made by the CPU; outputting the VPC to the instruction address bus; and updating the VPC; and prefetching the NERP concurrent with tile execution of the host instructions in the current emulation routine.

DETAILED DESCRIPTION OF THE PREFERRED EMBODIMENTS

Figure 1:
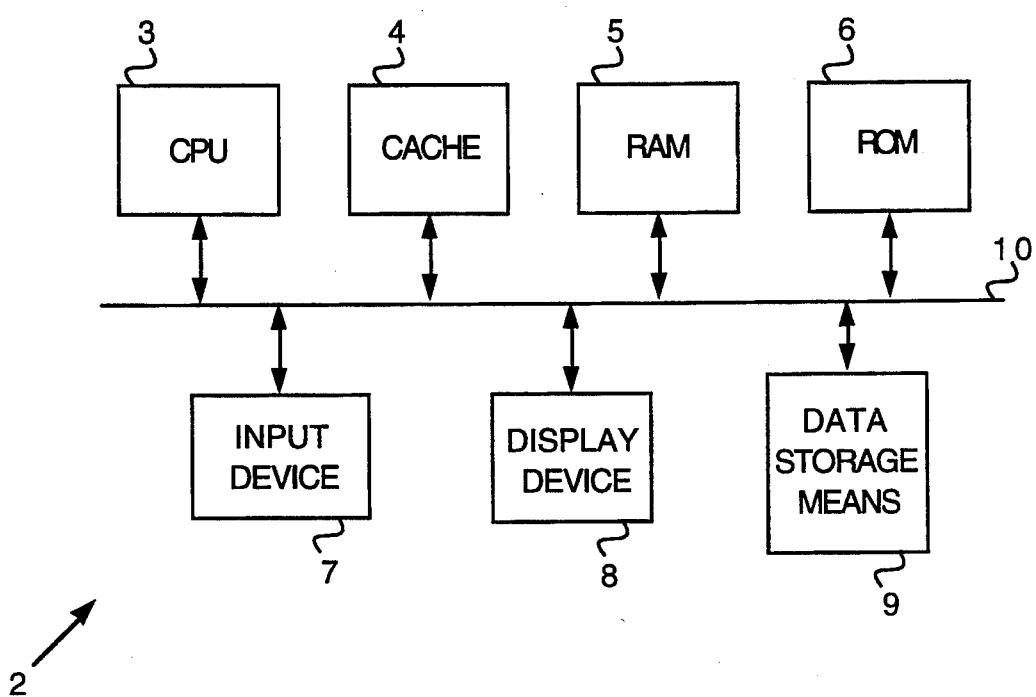
FIG. 1 is a block diagram of a computer system capable of functioning with the apparatus and method of the present invention.

In the execution of a computer program comprising a set of instructions, a computer system's CPU issues a next instruction request to retrieve a next instruction after completing the execution of a current instruction. The computer system maintains a program counter (PC) that indicates the address at which the next instruction is stored. As a result of the next instruction request, the instruction stored at the address indicated by the PC is transferred or issued by the CPU. These steps are repeated until each instruction within the computer program has been executed.

In an interpretive emulation environment, a host computer system functions as an interpretive emulator, where each source instruction within a source instruction program is emulated by the execution of an appropriate set of host instructions within an emulation routine. During the execution of a current host instruction within a current emulation routine, the host computer system's CPU issues a next host instruction request to retrieve a next host instruction. An instruction issue apparatus 25 of the present invention maintains a virtual program counter (VPC) 250 of host instructions that form emulation routines. When the CPU makes the next host instruction request, the apparatus 25 supplies the VPC value as the next host instruction's address instead of the host CPU's PC. As a result, the host instruction stored at the address indicated by the VPC is issued to the CPU. During the execution of the current emulation routine, the VPC simply indicates the address of the next host instruction within the current emulation routine.

The apparatus of the present invention is particularly advantageous over the prior art because at optimum operation, the apparatus of the present invention eliminates the performance overhead associated with the dispatch loop which is required for most processors to emulate instructions (source) of another architecture. The apparatus 25 of the present invention effectively translates the source instructions into a stream of host instructions, and feeds the stream of host instruction directly to the CPU by using the VPC to specify the address of the next host instruction to be executed. Concurrent with the execution of the current emulation routine's set of host instructions, the instruction issue apparatus 25 of the present invention prefetches a next emulation routine pointer (NERP) that provides the address of the next emulation routine. After the final host instruction in the current emulation routine has been executed, the CPU issues a next host instruction request. In response to the next host instruction request, the apparatus 25 supplies the NERP as the address at which the next host instruction is stored. This results in the issue of the first host instruction in the next emulation routine to the CPU. This process is then repeated for each set of host instructions corresponding to a source instruction of the source program. Thus, with the apparatus 25 of the present invention, the CPU only executes the host instructions required to emulate a source instruction, and the overhead of having the CPU execute host instructions of the dispatch loop as in prior art emulators is greatly reduced.

Referring now to FIG. 1, a block diagram of a host computer system 2 capable of functioning with the apparatus and method of the present invention is shown. The host computer system 2 comprises a central processing unit (CPU) 3, a cache memory 4, given amounts of random access memory (RAM) 5 and read-only memory (ROM) 6, an input device 7 such as a keyboard, an output or display device 8, and a data storage means 9 such as a hard disk drive. All elements of the host computer system 2 are coupled to a common bus 10 in a Von Neumann architecture, where the common bus 10 comprises an address bus 12, a data bus 14, a control bus 16, an instruction address bus 18, and an instruction bus 20. The CPU 3 is preferably a RISC processor. An exemplary host computer system comprises a Motorola 88100 CPU, a Motorola 88200 16-kilobyte cache, 8 megabytes of RAM, a keyboard, a color display, and an 80 megabyte hard disk.

Figure 2:
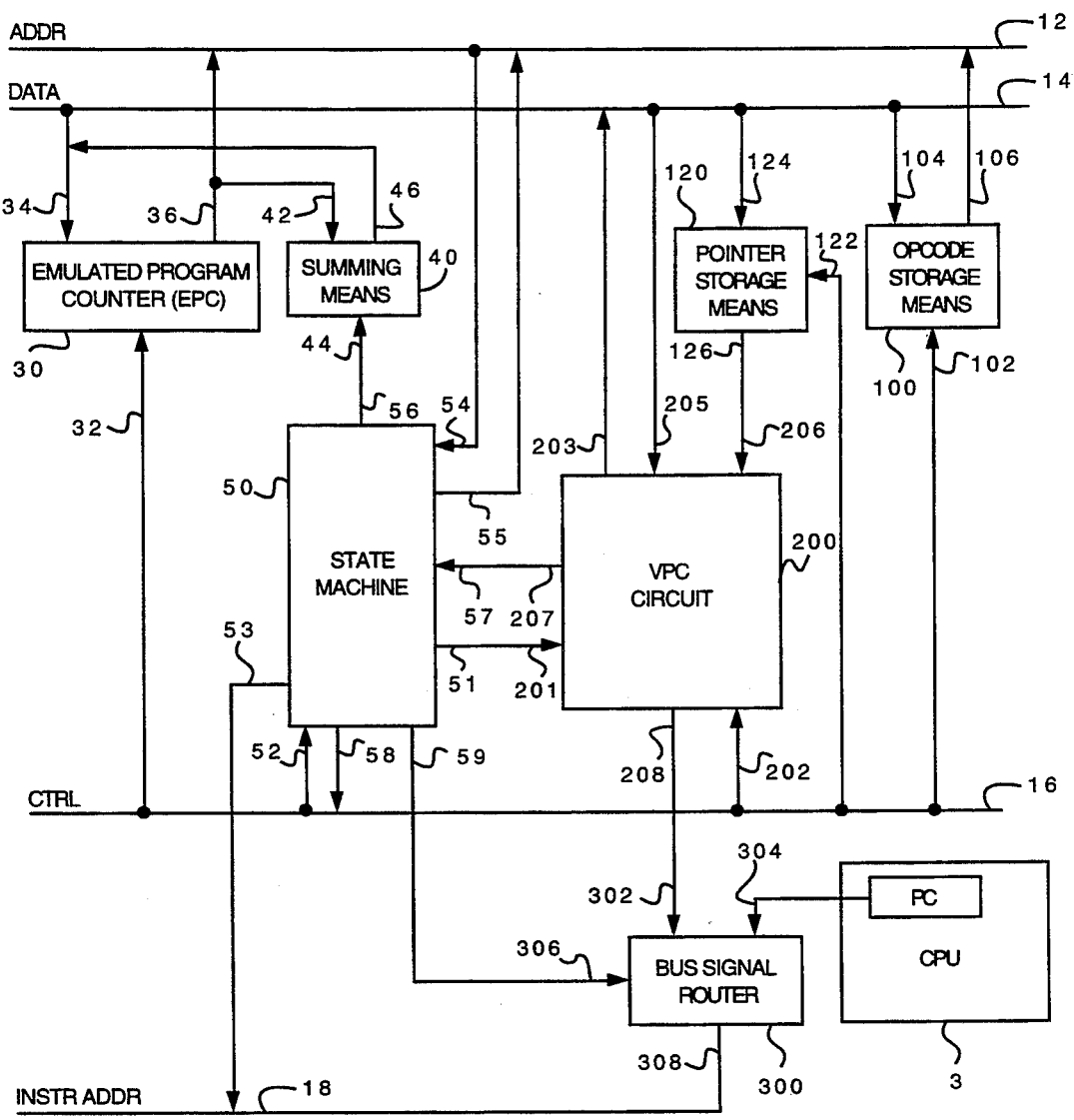
FIG. 2 is a block diagram of a preferred embodiment of an emulation routine instruction issuing apparatus constructed in accordance with the present invention.

Referring now to FIG. 2, the preferred embodiment of an emulation routine instruction issue apparatus 25 constructed in accordance with the present invention is shown. The preferred embodiment of the apparatus 25 comprises an emulated program counter (EPC) 30, a summing means 40, an opcode storage means 100, a pointer storage means 120, a virtual program counter (VPC) circuit 200, a state machine 50, and a bus signal router 300. The address bus 12, data bus 14, control bus 16, instruction address bus 18, and instruction bus 20 serve to provide couplings between the elements of the apparatus 25 and the host computer system 2 of FIG. 1. In the preferred embodiment of the apparatus 25, these buses 12, 14, 16, 18, 20 are each 32 bits wide.

Upon initiation of the source instruction program's emulation, the state machine 50 issues a selection signal to the bus signal router 300. The bus signal router 300 comprises a multiplexor having a first input 302, a second input 304, a control input 306, and an output 308. The second input of the bus signal router 300 is coupled to the CPU 3 to receive the PC, and the output 308 of the bus signal router 300 is coupled to the instruction address bus 18. The bus signal router 300 simply replaces the host PC with the VPC on the instruction address bus 18. In response to a signal applied to its control input 306, the bus signal router 300 routes either the signal present at its first input 302 or the signal present at its second input 304 to its output 308. The bus signal router 300 ensures that the VPC value is used to indicate the address of the next host instruction to be executed rather than the host PC value throughout the emulation. Therefore, the bus signal router 300 receives the VPC value at its first input 302, and the host PC from the CPU 3 value at its second input 304. In the event that a software or hardware exception occurs, the state machine 50 resets the selection signal such that the host PC is granted access to the instruction address bus 18.

During the execution of the current emulation routine, the state machine 50 monitors control signals present upon the control bus 16. In response to a next host instruction request issued by the CPU 3, the state machine 50 outputs the VPC value by issuing a VPC output command to the VPC circuit 200. In response to the VPC output command, the VPC circuit 200 outputs the VPC value to the instruction address bus 18. As a result, the host instruction located at the address specified by the VPC value is placed upon the instruction bus 20 and is issued to the CPU 3.

The state machine 50 also monitors host instruction addresses during the execution of the current emulation routine. Prior to the execution of the final instruction in the current emulation routine, the VPC value simply indicates the address of the next host instruction to be executed within the current emulation routine. Once the final host instruction has been executed, the VPC value must indicate the address of the first host instruction in the next emulation routine. Therefore, the address of the first host instruction in the next emulation routine must be known before execution of the next emulation routine can begin. During the execution of the host instructions in the current emulation routine, the state machine 50 concurrently prefetches the NERP by issuing commands to the EPC 30, the opcode storage means 100, and the pointer storage means 120. Exemplary embodiments for this process are detailed below and in U.S. patent application Ser. No. 08/124,315, entitled "Apparatus And Method For Emulation Routine Pointer Prefetch" which is incorporated herein by reference. The NERP gives the address of the first host instruction in the next emulation routine. Therefore, the state machine 50 sets the VPC value to the NERP upon detecting the final host instruction's address in the current emulation routine.

The EPC 30 stores an emulated program counter value that indicates the address of the next source instruction. The state machine 50 updates the EPC 30 via the summing means 40. After the EPC 30 has been updated, the state machine 50 uses the contents of the EPC 30 to prefetch the next source instruction to be emulated. The opcode storage means 100 stores a plurality of bits of the next source instruction, where the plurality of bits is an opcode. Each source instruction has a unique opcode. On a computer system capable of executing source instructions directly (i.e., without emulation), each opcode corresponds to a microprogram that is executed to carry out the actions associated with the source instruction. The state machine 50 uses the contents of the opcode storage means 100 to prefetch a pointer to the next emulation routine, storing the pointer (NERP) in the pointer storage means 120. Once the NERP prefetch is completed, the VPC value can be equated to the NERP during the execution of the final host instruction in the current emulation routine.

The EPC 30 is preferably a data storage means having a control input 32, a load input 34, and an output 36. The control input 32 of the EPC 30 is coupled to the control bus 16, the load input 34 is coupled to the data bus 14, and the output 36 is coupled to the address bus 12. The EPC 30 can load a value in response to an appropriate control signal on the control bus 16. When such a control signal is received at the EPC's control input 32, the EPC 30 loads the value at it's load input 34 from the data bus 14. The CPU 3 loads the EPC 30 with an initial emulated program counter value in this manner during initialization of the apparatus 25. The emulation routine for a source instruction corresponding to a branch also causes the CPU 3 to directly load the EPC 30. The contents of the EPC 30 correspond to a program counter indicating the next source instruction to be emulated from a source instruction program. This value appears at the output 36 of the EPC 30. The program counter value contained within the EPC 30 indicates the address of the next source instruction to be emulated; thus, the EPC 30 contents are an emulated program counter value. In an exemplary embodiment, the EPC 30 is a register formed of D-flip flops.

The summing means 40 preferably comprises an adder having a first input 42, a second input 44, and an output 46. The first input 42 of the summing means 40 is coupled to the output 36 of the EPC 30, the second input 44 of the summing means 40 is coupled to the state machine 50, and the output 46 of the summing means 40 is coupled to the EPC's load input 34. The summing means 40 is used to determine the next source instruction to be emulated following a current source instruction by incrementing the emulated program counter value stored in the EPC 30. The summing means 40 increments the emulated program counter value according to the execution of a predetermined host instruction within the current source instruction's emulation routine. An emulated program counter value received at the summing means' first input 42 is added to an appropriate increment value generated by the state machine 50, to produce an updated emulated program counter value at the output 46 of the summing means 40. The output 46 of the summing means 40 is coupled to the input 34 of the EPC 30 to store the updated emulated program counter value in the EPC 30. Alternatively, the summing means 40 may include a register (not shown). The register preferably has its inputs coupled to the data bus 14 and its output coupled to the second input 44 of the summing means 40. A reserved address reference can cause a corresponding increment value to be stored in the register. The increment value stored in the register is sent to summing means 40 such that the summing means 40 produces the sum of the value currently in the EPC 30 plus the value currently in the register.

The opcode storage means 100 preferably comprises a data storage means having a control input 102, an opcode input 104, and an address output 106. The opcode storage means 100 is preferably one or more registers, and a decoder. The control input 102 is coupled to the control bus 16, while the opcode input 104 and the address output 106 are coupled to the data bus 14 and address bus 12, respectively. Upon receipt of a load opcode command at its control input 102, the opcode storage means 100 loads a plurality of bits representing an opcode from a signal present at its opcode input 104. The state machine 50 issues the load opcode command during the prefetch of the pointer to the next emulation routine. In the prefetch, the signal present at the opcode input 104 is the next source instruction to be emulated. The opcode storage means 100 loads the next source instruction's opcode. Each source instruction has a unique opcode, and the set of all source instruction opcodes is a set of consecutive integers. Therefore, each opcode is used as an offset to a base memory address to indicate a unique memory address within a consecutive memory address range. This in turn uniquely associates each source instruction with a memory address within the consecutive memory address range. Each memory address within the consecutive memory address range stores a pointer to the emulation routine for the source instruction associated with the memory address. Within the opcode storage means 100, a plurality of bits are reserved for indicating the base memory address. The CPU 3 issues a load base memory address command to the opcode storage means 100 prior to starting the source instruction program's emulation. When the state machine 50 issues the load opcode command, the opcode bits present upon the data bus 14 are loaded into the opcode storage means 100 such that the opcode bits are concatenated with the base memory address bits, thereby generating the memory address of the pointer to the next emulation routine. This memory address is used by the state machine 50 to complete the prefetch operation.

Those skilled in the art will recognize that in an alternate embodiment of the apparatus 25, the opcode storage means 100 can be implemented as a buffer capable of storing a plurality of source instruction opcodes received from a burst memory read operation performed by the state machine 50.

The pointer storage means 120 is preferably a data storage means having a control input 122, a data input 124, and a data output 126. The pointer storage means 120 is preferably a register and a decoder. The control input 122 is coupled to the control bus 16, and the data input 124 is coupled to the data bus 14. The pointer storage means 120 receives commands via its control input 122. The state machine 50 issues a load pointer storage command to the pointer storage means 120 when the next emulation routine pointer is available on the data bus 14. In prior art interpretive emulators the operations of fetching the next source instruction and fetching the pointer to the next emulation routine would not begin until after the current emulation routine has completed its execution. These fetch operations can take as long as the execution of an entire emulation routine. The apparatus 25 of the present invention performs these fetch operations concurrent with the execution of the current emulation routine. This results in significantly accelerated interpretive emulation.

The VPC circuit 200 comprises a means for selectively generating, storing, and outputting the VPC value. The VPC circuit 200 has an increment control input 201, a control input 202, a data output 203, a data input 205, a NERP input 206, a first output 207, and a second output 208. The control input 202 is coupled to the control bus 16; the data output 203 and the data input 205 are coupled to the data bus 14; and the second output 208 is coupled to the instruction address bus 18 through the first input 302 of the router 300. The NERP input 206 is coupled to the output 126 of the pointer storage means 120. The VPC circuit 200 receives VPC update commands, load and output data commands, and VPC output commands from the state machine 50 via its control input 202. The value of the VPC 250 is stored within the VPC circuit 200. In response to an output data command, the VPC circuit 200 outputs the value of the VPC to the data bus 14. In response to a VPC update command, the VPC circuit 200 selectively increments the VPC value according to an increment select signal received at its increment select input 201 from the state machine 50. The updated VPC value is sent to the state machine 50 via the first output 207. In the: preferred embodiment of the apparatus 25, each host instruction occupies a fixed number of addresses. Therefore, the standard VPC increment is a predetermined constant. This corresponds to the instruction size conventions found in nearly all RISC architectures. In the event that a jump to a target address is required within an emulation routine, the increment applied to the VPC value must indicate the difference between the VPC value and the target address. In most RISC architectures, a jump host instruction specifying an absolute address is not supported. Instead, the jump host instruction indicates a jump made relative to the value of the host PC. However, in the apparatus 25 of the present invention, the host PC does not have a fixed relationship with the VPC since the host PC is ignored during the emulation process. Therefore, a jump host instruction cannot be used to perform the desired jump when performing an emulation. In the preferred embodiment of the apparatus 25, a store host instruction referring to a first dedicated address and to a jump increment is used to perform a jump when operating within an emulation routine. A store host instruction indicates a value to be stored and an address at which to store the value. In the execution of a store host instruction, the CPU 3 asserts the store address on the address bus 12, and places the value to be stored on the data bus 14. In the preferred embodiment of the apparatus 25, the store host instruction referring to the first dedicated address results in the first dedicated address being asserted on the address bus 12, and the jump increment being asserted on the data bus 14. Upon detection of the first dedicated address, the state machine 50 issues a load data command to the VPC circuit 200. The VPC circuit 200 receives the load data command at its control input 202, and in response, loads the jump increment from the data bus 14. After loading the jump increment, state machine 50 sets the increment select signal such that the VPC circuit 200 uses the jump increment rather than the increment constant when updating the VPC value in response to a subsequent VPC update command. After the VPC value has been updated, the VPC value can be output. Receipt of a VPC output command causes the VPC circuit 200 to transfer the VPC value to the instruction address bus 18.

Receipt of a VPC NERP command causes the VPC circuit 200 to set the VPC value to the NERP present at its NERP input 206. The VPC NERP command is issued when the current emulation routine has reached its final host instruction, thereby ensuring that the VPC value is the address of the first host instruction in the next emulation routine.

The state machine 50 is preferably a state machine capable of issuing apparatus 25 control and DMA commands, and has an increment select output 51; a control input 52; a stall output 53; a code input 54; an address output 55; an increment signal output 56; an address test input 57; a control output 58; and a bus signal selection output 59. The control input 52 and the control output 58 are coupled to the control bus 16, the code input 54 and the address output 55 are coupled to the address bus 12, and the stall output 53 is coupled to the instruction address bus 18. The bus selection output 59 is coupled to the control input 306 of the bus signal router 300. The increment select output 51 is coupled to the VPC circuit's increment select input 201, and the address test input 57 is coupled to the VPC circuit's first output 207. The increment signal output 56 is coupled to the second input 44 of the summing means 40. The state machine 50 receives control information via its control input 52, and performs DMA operations and issues commands to the EPC 30, the opcode storage means 100, the pointer storage means 120, and the VPC circuit 140 via the control output 58.

To begin the emulation process, the CPU 3 transfers control to the apparatus 25 of the preferred invention by issuing an initiate emulation command on the control bus 16. In response to detection of the initiate emulation command at its control input 52, the state machine 50 outputs the selection signal at its bus selection signal output 59, thereby ensuring that the VPC circuit 200 is allowed access to the instruction address bus 18 and excluding the host PC from instruction bus 18 access.

The state machine 50 monitors the control bus 16 during the emulation of the source instruction program. If a next host instruction request issued by the CPU 3 is detected, the state machine 50 outputs the VPC value to the instruction address bus 18 by issuing the VPC output command to the VPC circuit 200. In response to the VPC output command, the VPC circuit 200 outputs the VPC value to the instruction bus 18. In the next host instruction request, the address present on the instruction address bus 18 is used in the transfer of a host instruction stored at this address to the instruction bus 20. Next, the state machine 50 determines if the current VPC value is the address of the final host instruction in the emulation routine by loading the current VPC value and comparing it to the final host instruction address. If the current VPC value is not the final host instruction address, the state machine 50 updates the VPC value by issuing a VPC update command at its control output 58, wherein the value of the increment control signal is such that the predetermined constant is selected by the VPC circuit 200 in the update. If the VPC value indicates that the final host instruction has been reached, the next host instruction to be executed is the first host instruction in the next emulation routine. Since the NERP indicates the address of the first host instruction in the next emulation routine, the state machine 50 determines if the NERP prefetch has been completed. If the NERP has been prefetched, the state machine 50 sets the VPC value to the NERP by issuing a VPC NERP command to the VPC circuit 200. If the NERP prefetch has not been completed prior to the CPU's next host instruction request after the final emulation routine's host instruction, the state machine 50 stalls CPU 3 access to the instruction address bus 18 by issuing the stall signal at its stall output 53. Normally, the NERP prefetch is completed before the next host instruction request issued by the CPU 3 after the current emulation routine's final host instruction, and the stall signal need not be issued.

The state machine 50 uses the EPC 30, the summing means 40, the opcode storage means 100, and the pointer storage means 120 to prefetch the NERP. In the present invention, the EPC 30 stores the address of the next source instruction to be emulated. Once the emulation of a source instruction has begun, that source instruction becomes the current source instruction, and its corresponding emulation routine becomes the current emulation routine. For emulation to continue, the EPC 30 must be incremented to the address of the source instruction that follows the current source instruction. Within the source instruction set, each source instruction to be emulated can vary in length. The emulated program counter value indicates the address of the next source instruction to be emulated, and thus, the EPC 30 can be accurately incremented only from within the current source instruction emulation routine. In the preferred embodiment of the apparatus 25, a set of memory addresses is reserved, where each reserved address within the set corresponds to a value by which the EPC 30 may be incremented.

The state machine 50 must monitor the current emulation routine's execution and determine when the emulation routine has arrived at its final host instruction. For a given emulation routine, the location of the final host instruction is known only within the emulation routine. Therefore, the set of reserved addresses is also used to indicate the location of the final host instruction within the emulation routine.

During the execution of every source instruction emulation routine, a host instruction causes a reserved address to be placed upon the address bus 12. This reserved address indicates the amount that the EPC 30 is to be incremented and the location of the final host instruction within the emulation routine. The state machine 50 monitors the address bus 12 via its code input 54, and detects whether the address present upon the address bus 12 is one of the reserved addresses. While the state machine 50 is monitoring the address bus 12 for the presence of a reserved address, it is in its initial state. If a reserved address is detected, the state machine 50 decodes the reserved address. As a result of the decoding, the state machine 50 generates an increment signal corresponding to the value by which the EPC 30 is to be incremented, and an instruction offset signal corresponding to the location of the final host instruction within the emulation routine. In the decoding, a first subset of bits within the reserved address is decoded to generate the increment signal, and a second subset of bits within the reserved address is decoded to generate the increment offset signal. In an exemplary reserved address definition, reserved addresses are recognizable as having high-order bits with a fixed value such as zero. For example, in a 32-bit address, if the eight high-order bits are zero, the address is a reserved address. For the 32-bit reserved address, the first subset of bits is taken from the eight address bits immediately adjacent the eight high-order bits, and the second subset is taken from the 16 low-order bits of the address. In this case, the 32-bit address 0002000F (Hexadecimal) indicates that the EPC 30 must be incremented by two, and that there are 15 (Hexadecimal F) host instruction addresses between the host instruction that made the reserved address reference and the final host instruction within the current emulation routine. In the decoding, an emulation routine referring to address 0002000F causes address 0002000F to appear upon the address bus 12. The state machine 50 detects that address 0002000F is a reserved address, and decodes it to generate an increment signal having the value two and an instruction offset signal having the value fifteen. The state machine 50 outputs the increment signal at its increment signal output 56, such that the summing means 40 produces the sum of the value currently in the EPC 30 plus the value provided by the state machine 50. In an alternate embodiment, a reserved address reference can cause a corresponding increment value to be stored in a register (not shown) having an input coupled to the data bus 14. The register also has an output coupled to the second input of the summing means 40, such that the summing means 40 produces the sum of the value currently in the EPC 30 plus the value currently in the register.

Since the increment signal was output to the summing means 40, the updated emulated program counter value is present at the summing means output 46. Therefore, the state machine 50 next stores the updated EPC value by issuing an EPC 30 load command. At this point, the EPC 30 indicates the address of the next source instruction to be emulated. The state machine 50 prefetches the next source instruction by issuing a first DMA command at its control output 58, where the contents of the EPC 30 are used as the memory read address. As a result of the first DMA read operation, the next source instruction is placed upon the data bus 14. The state machine 50 then stores a plurality of opcode bits in the opcode storage means 100 by issuing a load opcode command to the opcode storage means 100 via its control output 58.

Following issuance of the load opcode command, the state machine 50 issues a second DMA read command via the control output 58. In the second DMA read command, the opcode stored within the opcode storage means 100 is used to index a table in memory, where the table contains pointers to emulation routines. Upon completion of the second DMA read command, the pointer corresponding to the emulation routine indicated by the next source instruction's opcode is placed upon the data bus 14. This pointer is the NERP. The state machine 50 next stores the NERP with issuance of a load pointer storage command to the pointer storage means 120 via the control output 58, causing the pointer storage means 120 to load the NERP present on the data bus 14. After the state machine 50 has issued the load pointer command, the NERP becomes valid.

If the final host instruction in the current emulation routine has been reached, the VPC value must be set to the value of the NERP, thereby indicating the address of the first host instruction in the next emulation routine. When the CPU 3 issues the next host instruction request after the final host instruction in the current emulation routine has been executed, the state machine 50 sets the VPC value to the NERP by issuing the VPC NERP command. The state machine 50 next asserts the VPC value on the instruction address bus 18 by issuing the VPC output command. The first host instruction in the next emulation routine is then asserted on the instruction bus 20 and thereby issued to the CPU 3. At this point, the VPC value must be updated to indicate the host instruction address following the first host instruction in the next emulation routine. Therefore, the state machine 50 next updates the VPC value by issuing the VPC update command. In the event that the NERP has not become valid before the final host instruction address has been detected, the state machine 50 stalls the issue of the first host instruction in the next emulation routine to the CPU 3 by issuing the stall signal at its stall output 53. After the valid NERP is available, the state machine 50 releases the stall by issuing the release command at the stall output 53.

The state machine 50 also detects references to the first dedicated address corresponding to a jump required in the current emulation routine. The first dedicated address reference is a store host instruction, having an address parameter and a data parameter, where the first dedicated address is the address parameter and the jump increment to be applied to the VPC value is the data parameter. Execution of the store host instruction results in the assertion of the address parameter on the address bus 12 and the data parameter on the data bus 14. Therefore, the jump increment is present on the data bus 14 when the state machine 50 detects the first dedicated address on the address bus 12. After detection of the first dedicated address, the state machine 50 loads the jump increment into the VPC circuit 200 by issuing the data load command. The state machine 50 next updates the VPC value with the jump increment by setting the increment control signal to the value corresponding to the jump increment and issuing the VPC update command. At this point, the VPC value is the address of the host instruction targeted in the jump. The state machine 50 next places the VPC value on the instruction address bus 18 by issuing the VPC output command to the VPC circuit 200. In response to a next host instruction request by the CPU 3, the state machine 50 issues the next host instruction to the instruction bus 20 prior to updating the VPC value to indicate the next host instruction address. In the jump operation, the state machine 50 sets the VPC value to the targeted address using the jump increment, and issues the next host instruction corresponding to this address. The VPC value must be updated further at this point to indicate the address of the host instruction following the targeted address. Therefore, the state machine 50 updates the VPC value to the address of the host instruction following the targeted address by adding the predetermined constant to the VPC value through setting the increment control signal to the value corresponding to the predetermined constant and issuing the VPC update command.

The apparatus 25 of the present invention must be able to perform an appropriate set of actions in response to a software or hardware request to interrupt the normal flow of instruction execution. These requests are known as exceptions, and typically occur as a result of an error condition or when a software routine requires access to an operating system function. Examples of conditions that result in an exception include overflow in an arithmetic calculation; attempts to access nonexistent or protected memory addresses; and execution of an instruction that transfers control to the operating system. In the standard method for handling an exception, the CPU 3 stores the host PC value in a register, and transfers control to an exception handler or service routine located at a predetermined address. Upon completion of the operations required to handle the exception, the exception handler returns control to the instruction indicated by the PC. In the event that recover is not possible or desired, the exception handler returns control to the operating system. In the present invention, however the host PC has no fixed relationship with the VPC value; therefore, the exception handler must have access to the VPC value in order to return control to the apparatus 25 and thereby continue the emulation process at the proper address.

The state machine 50 detects the presence of exception signals on the control bus 16. If the state machine 50 detects an exception signal, the state machine 50 stores the VPC value at a second dedicated address. In the storing of the VPC value, the state machine 50 first issues the output data command to the VPC circuit 200, after which the state machine 50 asserts a store command on the control bus 16. The state machine 50 next asserts the second dedicated address upon the address bus 12, causing the VPC value present on the data bus to be stored in the location indicated by the second dedicated address. If an exception occurs in the preferred embodiment of the apparatus 25, the CPU 3 will store the host PC value, and transfer control to the exception handler. Upon completion of the operations required to handle the exception, the exception handler retrieves the VPC value stored at the second dedicated address, and jumps to the address indicated by the VPC value in the event that exception recovery is possible. If recovery from the exception is not possible or not desired, the exception handler returns control to the host operating system.

In the preferred embodiment of the present invention, a software exception instruction generates an exception in which control is returned to the host operating system is used to terminate the emulation process. This instruction is the final host instruction executed in the emulation process. In order to indicate this behavior in the source instruction program, a source end instruction is defined, wherein the emulation routine corresponding to the source end instruction includes the software exception instruction.

Figure 3:
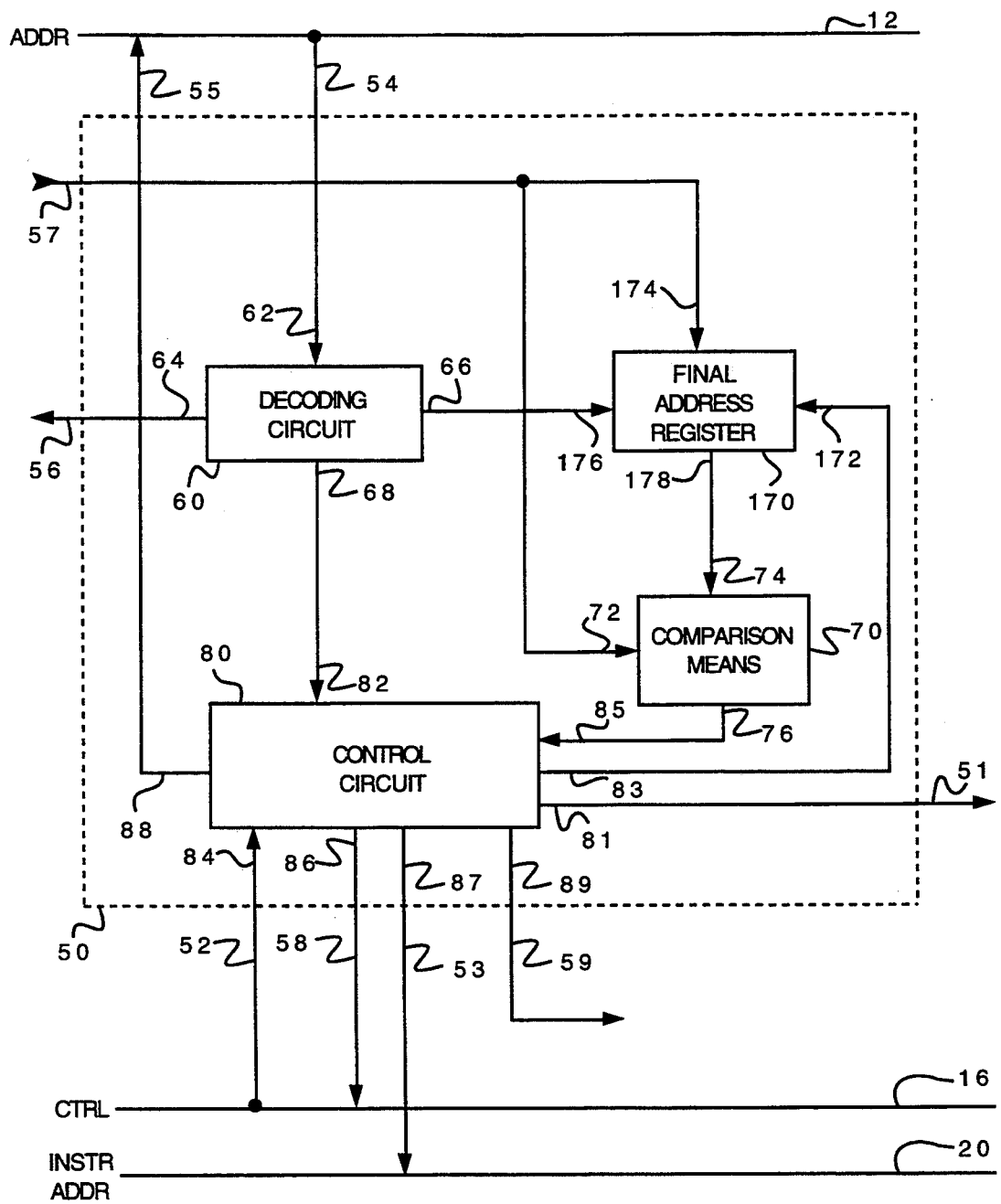
FIG. 3 is a block diagram of a preferred embodiment of a state machine of the present invention.

Referring now to FIG. 3, a block diagram of a preferred embodiment of the state machine 50 is shown. The state machine 50 comprises a decoding circuit 60, a comparison means 70, a control circuit 80, and a final address register 170. The decoding circuit 60 comprises a decoder having an input 62, a first decoded output 64, a second decoded output 66, and an acknowledgment output 68. The input 62 of the decoding circuit 60 forms the state machine's code input 54, and is coupled to the address bus 12. Since the input 62 is coupled to the address bus 12, the decoding circuit 60 receives all addresses asserted on the address bus 12. The first decoded output 64 provides the state machine's increment signal output 56. If an address received corresponds to one of the reserved addresses, the decoding circuit 60 produces an appropriate increment value at the first decoded output 64. This value is used by the summing means 40 to update the EPC 30 by an amount corresponding to the particular reserved address received. In response to receipt of the reserved addresses, the decoding circuit 60 also produces an instruction offset signal at its second decoded output 66. The instruction offset signal indicates the address of the final host instruction relative to the address of the store host instruction making the first dedicated address reference.

The decoding circuit 60 produces at its acknowledgment output 68 a first acknowledgment signal in response to receipt of a reserved address. Since the decoding circuit 60 receives all addresses asserted on the address bus 12, the decoding circuit 60 is also used to inform the control circuit 80 that the first dedicated address has been detected. In response to the presence of the first dedicated address on the address bus 12, the decoding circuit 60 produces a second acknowledgment signal at its acknowledgment output 68. The first and second acknowledgment signals are received by the control circuit 80 and result in the initiation an appropriate sequence of state control commands. In the preferred embodiment, the decoding circuit 60 comprises a 32-bit decoder, receiving 32-bit addresses from the address bus 12 and outputting a 4-bit increment value and an 8-bit instruction offset signal.

The final address register 170 comprises an adder and a register having a control input 172, a first input 174, a second input 176, and an output 178. The first input 174 of the final address register 170 is coupled to the address test input 57 of the state machine 50, and therefore receives the VPC value. The second input 156 of the final address register is coupled to the second decoded output 66 of the decoding circuit 60, receiving the instruction offset signal in the event that a host instruction referencing a reserved address has been executed. The final address register 170 adds the VPC value present at its first input 174 to the instruction offset signal received at its second input 176 to produce an address sum. Upon receipt of a load address command at its control input 172, the final address register 170 stores the address sum. In the preferred embodiment of the apparatus 25, the load address command is issued in the event that the decoding circuit 60 has detected a reserved address on the address bus 12. The address indicated by the VPC value is then the address of the host instruction following the host instruction that made the reserved address reference. The decoding circuit 60 decodes the reserved address such that the instruction offset signal indicates the number of host instructions in the current emulation routine between the host instruction that made the reserved address reference and the final host instruction. After a reserved address reference has been made, the address sum produced by the final address register 170 is the address of the final host instruction in the current emulation routine. After storing the final host instruction's address in response to receipt of the load address command, this address is output at the final address register's output 178.

The comparison means 70 comprises a comparator having a first input 72, a second input 74, and an output 76. The first input 72 is coupled to the state machine's first address test input 57, and receives the VPC value. The second input 74 of the comparison means 70 is coupled to the output 178 of the final address register 170 and therefore receives the address of the final host instruction in the current emulation routine after a reserved address reference has been made. When the instruction address present at the comparison means first input 72 is greater than the final host instruction address, the comparison means 70 generates a routine completion signal at its output 76. The routine completion signal indicates that the final host instruction in the current emulation routine has been issued to the CPU 3, and that the VPC value must be set to the NERP is response to the next host instruction request issued by the CPU 3 upon its completion of the final host instruction's execution.

The control circuit 80 preferably comprises control logic for issuing the sequence of state control commands in response to the detection of next host instruction requests on the control bus 16 or receipt of the first or second acknowledgment signals from the decoding circuit 60 and includes an increment control output 81, an acknowledgment input 82, a load address output 83, a control input 84, a routine completion input 85, a stall output 87, a control output 86, an address output 88, and a bus control output 89. The increment control output 81 forms the state machine's increment control output 51, and the stall output 87 forms the state machine's stall output 53. The control circuit's control input 84 and control output 86 form the state machine's control input 52 and control output 58, respectively, and are coupled to the control bus 16. The acknowledgment input 82 is coupled to the decoding circuit's acknowledgment output 68; the routine completion input 85 is coupled to the output 76 of the comparison means 70; and the load address output 83 is coupled to the control input 172 of the final address register 170. The control circuit 80 receives the first and second acknowledgment signals at its acknowledgment input 82, and detects the presence of a next host instruction request issued by the CPU 3 on the control bus 16. Prior to receiving either of the acknowledgment signals or detecting a next host instruction request, the control circuit 80 is in an initial state. Receipt of the first acknowledgment signal indicates that a reference to one of the reserved addresses has been made, and causes the control circuit 80 to issue a first sequence of state control signals and commands. Receipt of the second acknowledgment signal indicates that a reference to the first dedicated address has been made, and causes the control circuit 80 to issue a second sequence of state control signals and commands. In like manner, the detection of a next host instruction request on the control bus 16 causes the control circuit 80 to issue a third sequence of state control signals and commands. Upon completion of the first, second, or third sequence of state control commands, the control circuit 80 returns to its initial state. In the preferred embodiment, the control circuit 80 is referenced to a system clock, thereby ensuring that each signal and command is issued at an appropriate time.

The first sequence of signals and commands includes the NERP valid signal, the EPC load command, the first DMA read command, the load opcode command, the second DMA read command, and the load pointer command. The NERP valid signal is simply a flag signal internal to the control circuit 80 that is set after the NERP prefetch has been completed, indicating the NERP can be used to accurately indicate the address of the first host instruction in the next emulation routine. The control circuit 80 resets the NERP valid signal just prior to beginning another prefetch operation in response to receipt of the first acknowledgment signal.

When the control circuit 80 receives the second acknowledgment signal from the decoding circuit 60 indicating the first dedicated address has been referenced corresponding to a jump operation, the second sequence of signals and commands is issued. The second sequence of signals and commands comprises the load data command, the increment control signal, the VPC update command, and the VPC output command. The third sequence of signals and commands includes the VPC output command, the NERP valid signal, the VPC NERP command, and the VPC update command.

Figure 4:
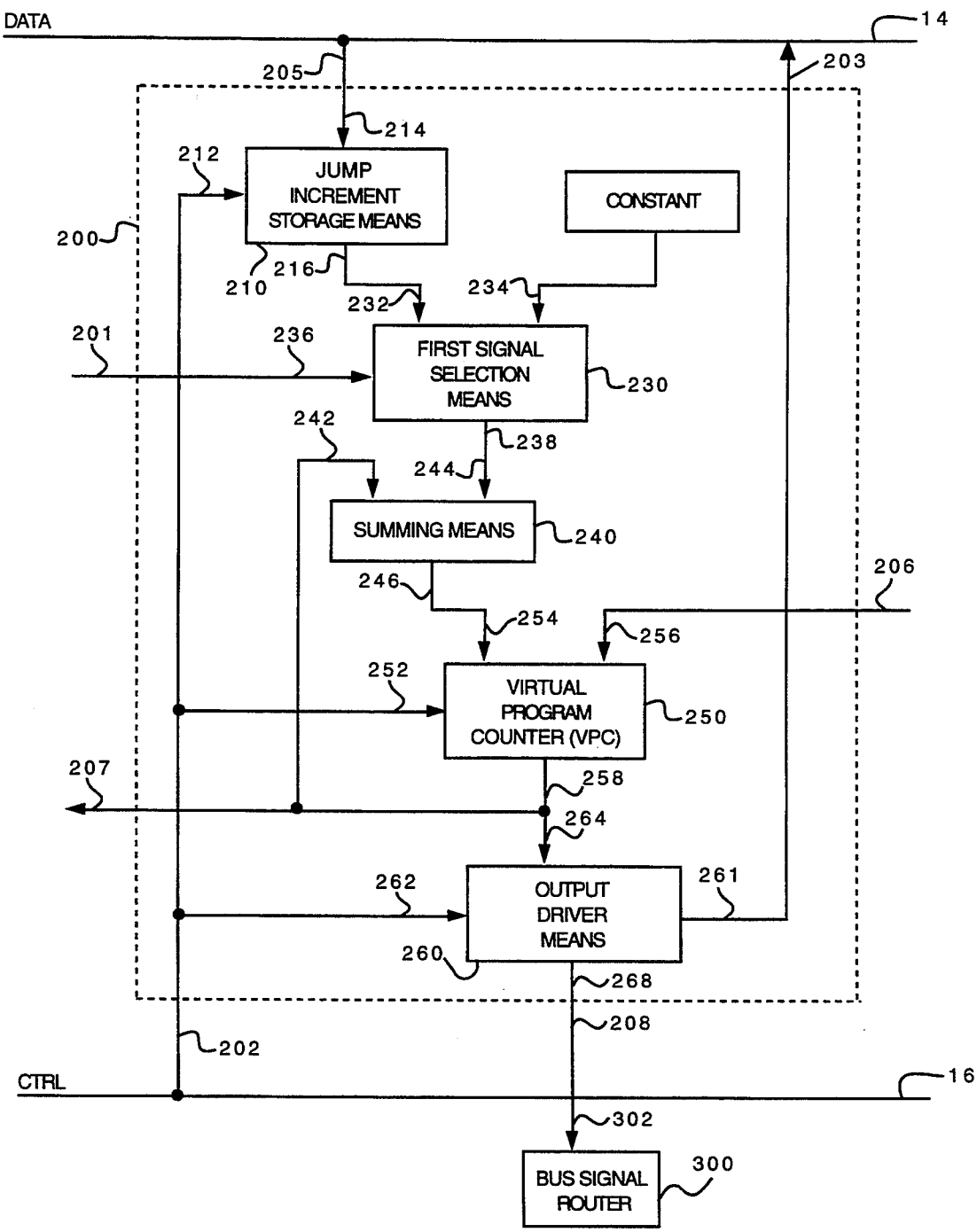
FIG. 4 is a block diagram of a preferred embodiment of a virtual program counter (VPC) circuit of the present invention.

Referring now to FIG. 4, a block diagram of a preferred embodiment of the VPC circuit 200 is shown. As has been noted above, the VPC circuit 200 maintains a virtual program counter for specifying the address of the next host instruction to be executed by the CPU 3. The VPC circuit 200 preferably comprises a jump increment storage means 210, a first signal selection means 230, a summing means 240, a virtual program counter (VPC) 250, and an output driver means 260.

The jump increment storage means 210 is preferably a register and a decoder, and has a data input 214, a control input 212 and an output 216. The data input 214 forms the data input 205 of the VPC circuit 200 and is coupled to the data bus 14 for receiving and storing a value that the VPC 50 is to be increment if a jump instruction is to be executed, since the VPC 50 must be increment by the same amount as the PC of the CPU 3 would be increment. The control input 212 of the jump increment storage means 210 forms the control input 202 of the VPC circuit 200 and is coupled to the control bus 16. The control input 212 receives control signals from the control bus 16 and decodes them. If the signal on the control bus 16 is a load data command, the decoder outputs a signal to latch the data at the data input 214 into the register.

The first selection means 230 is preferably a decoder and a plurality of multiplexors. The first selection means 230 is used provide the appropriate value by which to increase the VPC 250. If a jump instruction is being executed, the value the VPC 250 must be increased is stored in the jump increment storage means 210 and this value must be added to the VPC 250 by the summing means 240. However, if it is not a jump instruction, then the VPC 250 need only be incremented by the length of one host instruction. This is done by routing a constant, equal to the length of one host instruction, to the summing means 240 for addition to the VPC 250. The first selection means 230 has a first data input 232, a second data input 234, a control input 236 and an output 238. The first data input 232 of the first selection means 230 is coupled to the output 216 of the jump increment storage means 210. The second data input 234 is preferably coupled to receive a constant. For example, the bits of the second data input 234 can be connected to ground or high to provide the appropriate constant. The control input 236 forms the increment control input 201 of the VPC circuit 200 and is coupled to the increment control output 51 of the state machine 50 for receiving the increment control signal.

The summing means 240 is preferably an arithmetic logic unit and has a first input 242, a second input 244 and an output 246. The summing means 240 is used to add the current value of the VPC 250 with the output 238 of the first selection means 230. The summing means 240 is able to add both positive and negative values to the VPC to accommodate backward relative branches. For example, the summing means 240 might use two's complement addition to decrease the values stored in the VPC 250. The second input 244 of the summing means 240 is coupled to the output 238 of the first selection means 230.

The VPC 250 is preferably a decoder, a multiplexor and a register. The VPC 250 stores either the updated VPC value output by the summing means 240 or a pointer to the next emulation routine from the pointer storage means 120. The VPC 250 has a control input 252, a first data input 254, a second data input 256, and an output 258. The data inputs of the multiplexor form the first and second inputs 254, 256 of VPC 250 and are coupled to the output 246 of the summing means 240 and the output 126 of the pointer storage means 120, respectively. The output of the multiplexor is coupled to the input of the register. The outputs of the register form the output 258 of the VPC 250. The control input 252 of the VPC 250 is coupled to the control bus 16 and receives control signals. The control input 252 of the VPC 250 is formed by the inputs of the decoder. The VPC 250 responds to a VPC update command by routing the output by the summing means 240 to the register and storing the data at the first input 254 in the register. The VPC 250 responds to a NERP update command by routing the output from the pointer storage means 120 to the register and storing the data at the second input 256 in the register. Those skilled in the art will recognize that the output of the decoder in response to the VPC and NERP update commands along with combinational logic can be used to select an input of the multiplexor for output and latch the register. The output 258 of the VPC 250 is coupled to the first input 242 of the summing means 240. The output 258 of the VPC 250 also forms the first output 207 of the VPC circuit 200 and is coupled to the input 57 of the state machine 50.

The final component of the preferred embodiment of the VPC circuit 200 is the output driver means 260. The output driver means 260 preferably comprises a decoder and two sets of line drivers with outputs that can be selectively enabled and disabled. The output driver means 260 has a data input 264, a control input 262, a first output 261 and a second output 268. The data input 264 is coupled to the output 258 of the VPC 250. The inputs to the two sets of line drivers form the data input 264. The control input 262 is coupled to the control bus 16. The outputs of the first set of line drivers are the first output 261 and are coupled to the data bus 14. The outputs of the second set of line drivers are the second output 268 and are coupled to the first input 302 of the bus signal router 300. The output driver means 260 outputs the VPC 250 to the bus signal router 300 in response to either the VPC output command or the output data command. The control signals on the control bus 16 are decoded by the decoder and the output of the decoder enables the first set of line drivers in response to output data command, and enables the second set of line drivers in response to VPC output command.

Figure 5:
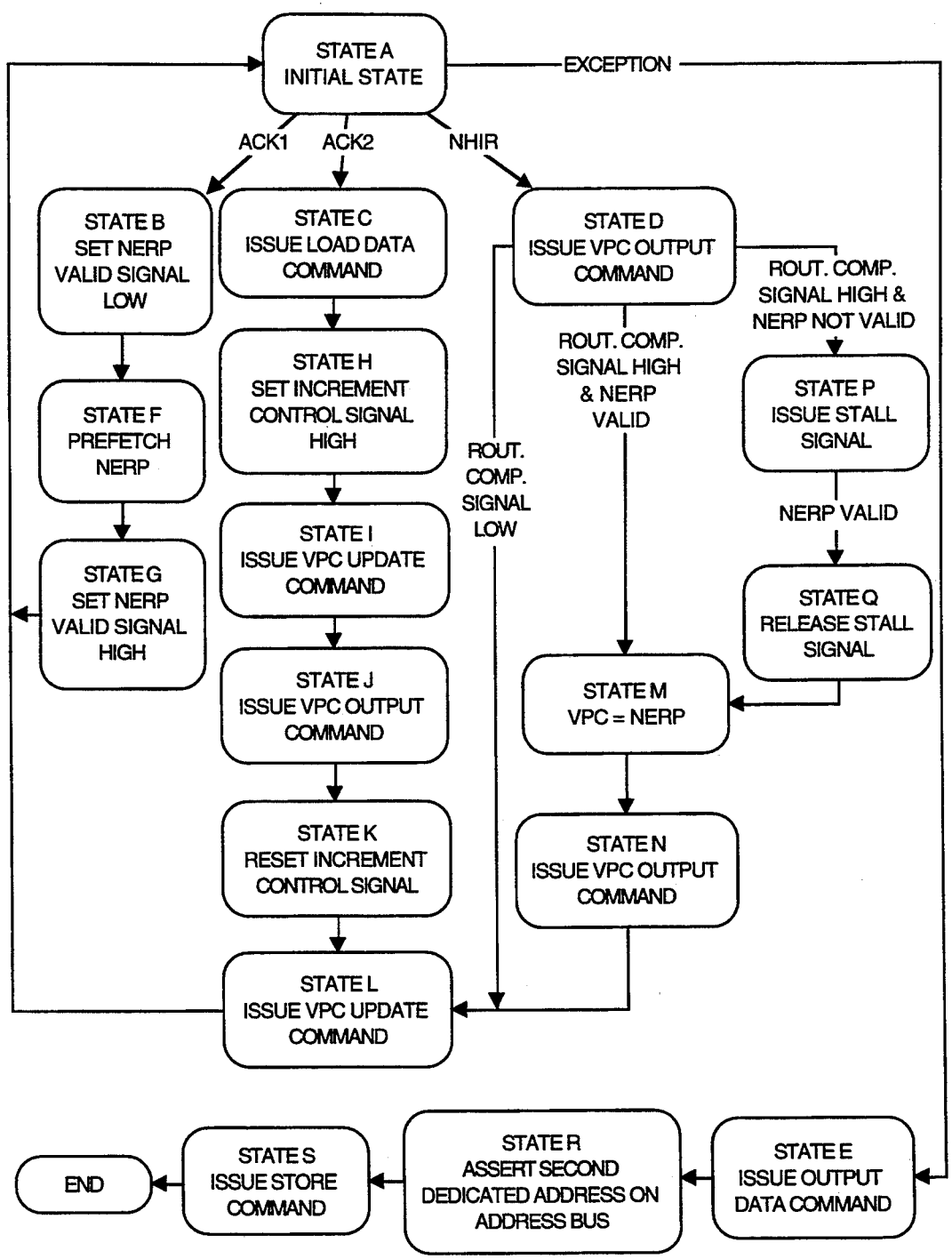
FIG. 5 is a state diagram of a preferred embodiment of a control circuit of the present invention.

Referring now to FIG. 5, a state diagram for the operation of the control circuit 80 of the preferred embodiment is shown. Control circuit 80 operation begins in an initial state A, with the control circuit 80 waiting for receipt of the first acknowledgment signal (ACK1), the second acknowledgment signal (ACK2), the next host instruction request (NHIR), or an exception. In the event that ACK1 is received in state A, a reserved address reference has been made and the control circuit 80 proceeds to state B and sets the NERP valid signal low. Following state B, the control circuit 80 prefetches the NERP in state F, after which the control circuit 80 sets the NERP valid signal high in state G. Following state G, the control circuit 80 returns to its initial state A.

If the ACK2 signal is received while in state A, a jump operation is required. In this case, the control circuit 80 proceeds from state A to state C, wherein the control circuit 80 issues the load data command to retrieve the jump increment from the data bus 14. Next, the control circuit 80 proceeds to state H, and sets the increment control signal high such that the jump increment will be added to the VPC value when the VPC is updated. After state H, the control circuit 80 issues the VPC update command in state I. The VPC value at this point is the address of the host instruction targeted in the jump operation. The control circuit 80 next issues the VPC output command in state J, asserting the VPC value on the instruction address bus 18. This results in the transfer of the host instruction targeted in the jump operation to the instruction bus 20, thereby issuing the targeted host instruction to the CPU 3. Next in state K, the control circuit 80 resets the increment control signal to a low value, such that the predetermined constant will be added to the VPC value when the VPC is updated. In state L, the control circuit 80 issues the VPC update command. At this point, the VPC value indicates the address of the host instruction following the targeted host instruction. Operation then returns to state A.

Receipt of the next host instruction request (NHIR) while in state A causes the control circuit 80 to transition to state D, wherein the control circuit 80 issues the VPC output command. The result of the VPC output command is the issuance of the next host instruction to the CPU 3. If the routine completion signal is low while in state D, the control circuit 80 advances to state L and issues the VPC updated command. After state L, the control circuit returns to state A.

If the routine completion signal is high and the NERP is valid while in state D, indicating that the VPC value must be set to the address of the first host instruction in the next emulation routine and the NERP prefetch has been completed, the control circuit 80 proceeds to state M and sets the VPC value to the NERP. Following state M, the control circuit 80 issues the VPC output command in state N to transfer the VPC value to the instruction address bus 18, the result of which is the issue of the first host instruction in the next emulation routine to the CPU 3. The control circuit 80 next proceeds to state L and issues the VPC update command. Following state L, the control circuit 80 returns to its initial state A.

If the routine completion signal is high and the NERP is not valid while in state D, the control circuit 80 proceeds to state P and issues the stall signal. Once the NERP becomes valid, the control circuit 80 releases the stall signal in state Q, and then proceeds to state M. The control circuit 80 then advances to states M, N, and L in the same manner indicated above, after which operation returns to state A.

Receipt of an exception while in state A causes the control circuit 80 to proceed to state E, wherein the control circuit 80 issues to output data command to transfer the VPC value to the data bus 14. The control circuit 80 then advances to state R, and asserts the second dedicated address on the address bus 12. Following state R, the control circuit 80 issues the store command in state S, thereby storing the VPC value to a predetermined location that is known to the exception handler. Following state S, the control circuit 80 terminates its operation.

Figure 6A:
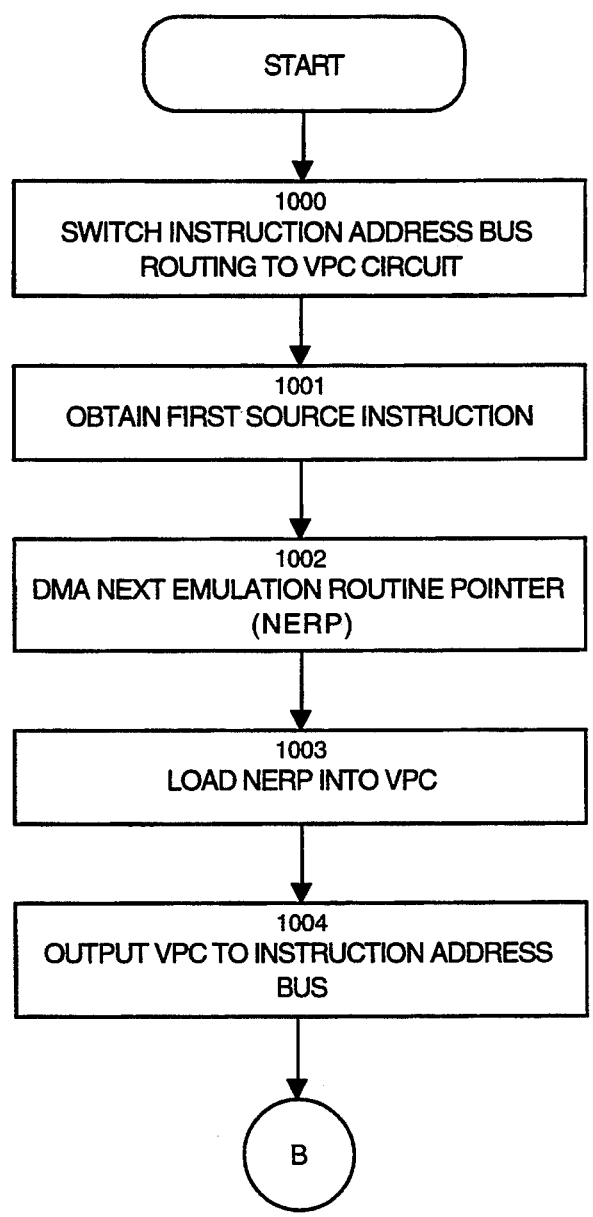
FIGS. 6A and 6B are a flowchart illustrating a preferred method for emulation routine instruction issuance.
Figure 6B:
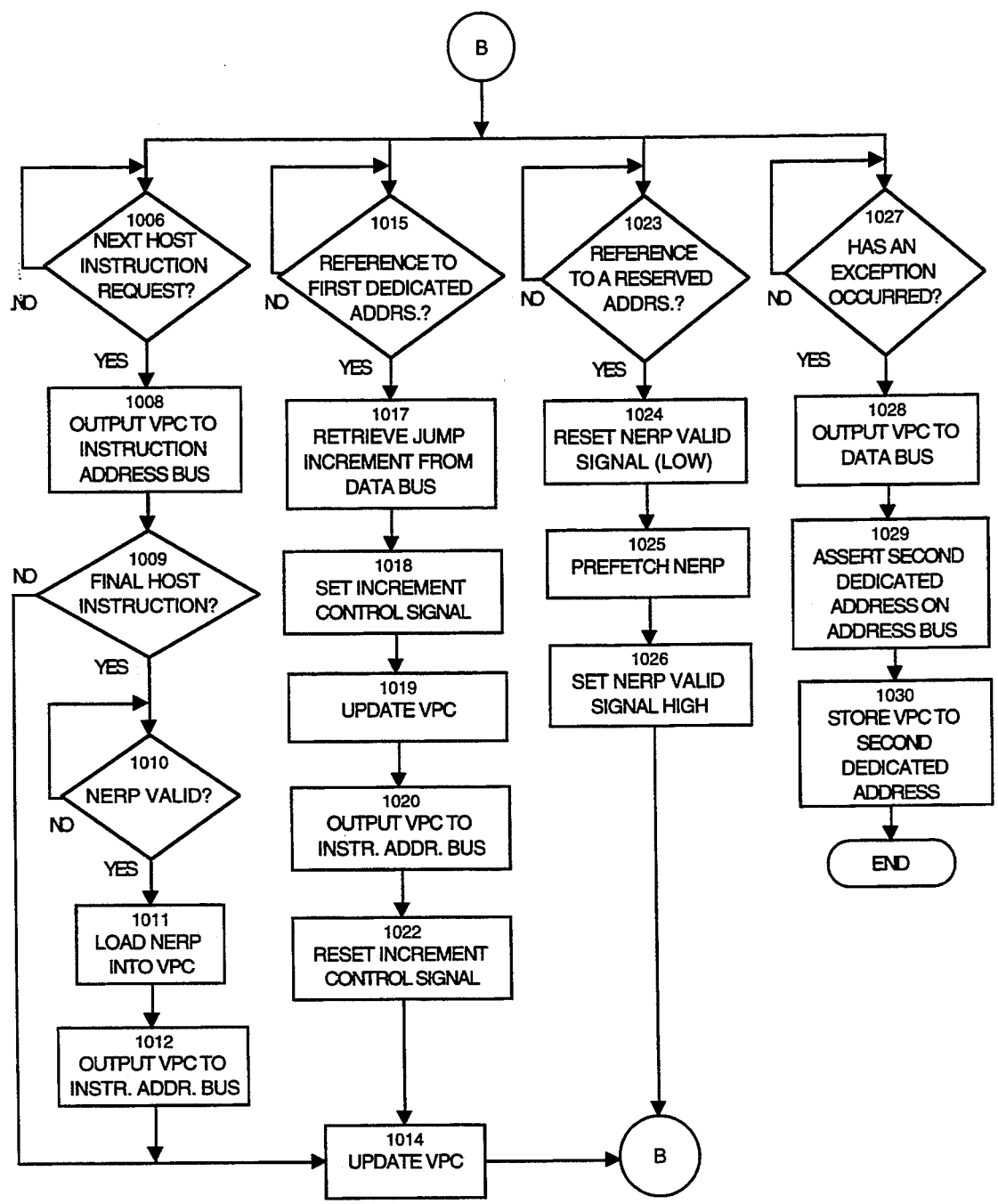

Referring now to FIG. 6A and 6B, a flowchart of a preferred method for emulation routine instruction issue is shown. The method begins in step 1000 by switching the routing of the instruction address bus 18 to the VPC circuit 200. Step 1000 ensures that the VPC value is used instead of the host PC value during the emulation process. After step 1000, the preferred method proceeds to step 1001 and obtains the first source instruction to be emulated. Using the opcode portion of the first source instruction, the preferred method next performs a DMA operation to obtain the NERP in step 1002. Following step 1002, the preferred method loads the NERP into the VPC in step 1003, thereby causing the VPC value to indicate the address of the first host instruction in the first emulation routine. The preferred method next outputs the VPC to the instruction address bus 18 in response to the CPU's next host instruction request in step 1004. This results in the host instruction stored at the address indicated by the VPC value to be transferred to the instruction bus 20, thereby issuing the first host instruction in the first emulation routine to the CPU 3. Following step 1004, the preferred method advances to steps 1006, 1015, 1023, and 1027 concurrently.

In step 1006, the preferred method determines whether a next host instruction request has been received from the CPU 3. If not, the preferred method remains at step 1006. Receipt of the next host instruction request in step 1006 causes the preferred method to output the VPC to the instruction address bus in step 1008, the result of which is the issuance of the next host instruction to the CPU 3. The preferred method then determines in step 1009 whether the final host instruction in the current emulation routine has been reached. If not, the preferred method proceeds to step 1014 and updates the VPC. Following step 1014, the preferred method returns to steps 1006, 1015, 1023, and 1027 concurrently.

If the preferred method determines in step 1009 that the final host instruction in the current emulation routine has been reached, the preferred method next determines if the NERP is valid in step 1010. If the NERP is not valid, the NERP prefetch has not been completed prior to the completion of the current emulation routine's execution, and the preferred method remains at step 1010. If the preferred method determines that the NERP is valid in step 1010, the preferred method proceeds to step 1011 and loads the NERP into the VPC. Next, in step 1012, the preferred method outputs the VPC to the instruction address bus. Following step 1012, the preferred method proceeds to step 1014 and updates the VPC. Following the VPC update in step 1014, the preferred method returns to steps 1006, 1015, 1023, and 1027 concurrently.

In step 1015, the preferred method determines if a reference to the first dedicated address has occurred, indicating that a jump operation is required. If such reference has not occurred, the preferred method remains in step 1015. Upon detection of the first dedicated address reference, the preferred method proceeds to step 1017 and retrieves or latches the jump increment from the data bus 14. Next, in step 1018, the preferred method sets the increment control signal, thereby ensuring that the jump increment is added to the VPC value in a subsequent VPC update operation rather than the predetermined constant. Following step 1018, the preferred method updates the VPC in step 1019. Next, the preferred method outputs the VPC to the instruction address bus 18 in step 1020, the result of which is the issuance of the host instruction targeted in the jump operation to the CPU 3. Following step 1020, the preferred method resets the increment control signal in step 1022, thereby ensuring that the predetermined constant is used in the next VPC update rather than the jump increment. The preferred method then proceeds to step 1014 and updates the VPC. Following step 1014, the preferred method returns to steps 1006, 1015, 1023, and 1027 in parallel.

In step 1023, the preferred method determines if a reference to a reserved address has occurred. Reference to a reserved address indicates that the NERP is to be prefetched, and provides an indication of the address of the current emulation routine's final host instruction. If reference to a reserved address has not been made, the preferred method remains m step 1023. If the preferred method determines that reference to a reserved address has occurred in step 1023, the preferred method proceeds to step 1024 and resets the NERP valid signal. Next, the preferred method prefetches the NERP in step 1024. Following step 1024, the preferred method sets the NERP valid signal high in step 1025. After step 1025, the preferred method returns to steps 1006, 1015, 1023, and 1027 in parallel.

In step 1027, the preferred method determines if an exception has occurred. If not, the preferred method remains at step 1027. If an exception has occurred, the preferred method proceeds to step 1028 and outputs the VPC to the data bus 14. Following step 1028, the preferred method asserts the second dedicated address on the address bus 12 in step 1029. Next, the preferred method stores the VPC to the second address in step 1030. Following step 1030, the preferred method ends. Depending upon the particular exception that has occurred, the exception handler will either return control to the preferred method at steps 1006, 1015, 1023, and 1027, or the exception handler will transfer control to the host operating system.

Those skilled in the art will recognize that in an alternate embodiment of the present invention, the final host instruction within the current emulation can be indicated by decoding a reserved address reference to produce the appropriate EPC increment, and the data stored at the reserved address can be used to indicate the address of the final host instruction within the emulation routine relative to the host instruction making the reserved address reference. In this case, the emulation routine instruction issue apparatus must retrieve the data stored at the reserved address as an additional step. Similarly, in another alternate embodiment, the decoding could be used to indicate the address of the final host instruction in the emulation routine, and the contents stored at the reserved address could be used to store the appropriate EPC increment. In yet another alternate embodiment, each emulation routine's final host instruction is constrained to occur at a recognizable address boundary. This in turn requires that each emulation routine have a predetermined size. In this case, each host instruction address can be interpreted as having a starting address portion plus an offset portion. If the address of at least one host instruction is known prior to the execution of the final host instruction in the current emulation routine, the starting address portion can be extracted from the known address and added to the predetermined emulation routine size to produce the final host instruction address. The present invention is equally applicable to other alternate embodiments as well.

What is claimed is:

1. An apparatus for issuing instructions during emulation routines to a central processing unit (CPU) of a host computer system, the host computer system also having a memory, a control bus, a data bus, an address bus, and an address instruction bus, said apparatus comprising:

an emulated program counter having a control input, a load input, and an output, for storing an address of a next emulation routine to be executed from the data bus in response to a first control signal on the control input of the emulated program counter, the control input of the emulated program counter coupled to the control bus, the load input of the emulated program counter coupled to the data bus, and the output of the emulated program counter coupled to the address bus;

a pointer storage means having a control input, a data input, and an output, for storing a pointer to the next emulation routine in response to a second control signal on the control input of the pointer storage means, the control input of the pointer storage means coupled to the control bus, the data input of the pointer storage means coupled to the data bus;

a virtual counter generation circuit having a first control input, a second control input, a first data input, a second data input, an address output, and a data output for generating and storing a virtual program counter value, the first control input of the virtual counter generation circuit coupled to the control bus, the first data input of the virtual counter generation circuit coupled to the data bus, the second data input of the virtual counter generation circuit coupled to the output of the pointer storage means, the address output of the virtual counter generation circuit coupled to the instruction address bus, and the data output of the virtual counter generation circuit coupled to the data bus; and a state machine having a control input, an increment input, and a first control output, for detecting when the emulated program counter has been updated, for controlling the retrieval of a pointer to the next emulation routine to be executed from memory, and for issuing the virtual program counter value to the instruction address bus, the control input and the first control output of the state machine coupled to the control bus, and the increment input coupled to the address bus.

2. The apparatus of claim 1, further comprising:

a bus signal router having a first data input, a second data input, a control input and an output for selectively connecting one from the group of the first data input and the second data input to the instruction address bus, the first data input of the bus signal router coupled to output of the virtual counter generation circuit, the second data input of the bus signal router coupled to an output of the CPU to receive a program counter, the output of the bus signal router coupled to the instruction address bus, and wherein the state machine has a bus control output for providing a bus control signal, and the bus control output of the state machine is coupled to the control input of the bus signal router.

3. The apparatus of claim 2 wherein the bus signal router is a two to one multiplexor.

4. The apparatus of claim 1, further comprising:

a summing means having a first input, a second input, and an output, for incrementing the address stored in the emulated program counter in response to an increment signal from the state machine, the first input of the summing means coupled to the output of the emulated program counter, and the output of the summing means coupled to the load input of the emulated program counter; and wherein the state machine has an increment input, an increment output for receiving an address, decoding the address to generate an increment value, the increment input of the state machine coupled to the address bus, and the increment output of the state machine coupled to the second input of the summing means.

5. The apparatus of claim 4 wherein the emulated program counter is a decoder and a register.

6. The apparatus of claim 1, further comprising an opcode storage means, having a control input, an opcode input, and an output, for receiving an opcode and outputting an address corresponding to the opcode received, the control input of the opcode storage means coupled to the control bus, the opcode input coupled to the data bus, and the output of the opcode storage means coupled to the address bus.

7. The apparatus of claim 6, wherein the data bus has a plurality of data bits and the opcode input is coupled to a subset of the plurality of data bits forming the data bus, the subset being representative of the opcode.

8. The apparatus of claim 3, wherein the opcode storage means is a buffer having a plurality of registers, and wherein the state machine performs a burst memory read operation that allows a plurality of opcodes to be stored in the opcode storage means.

9. The apparatus of claim 1, wherein the state machine comprises:

a decoding circuit having an input, a first decode output, a second decode output, and an acknowledgment output, for detecting an update to the emulated program counter and for generating an increment signal specifying the amount to increment the PC, an instruction offset signal indicating the number of instructions to a final source instruction for the routine, and an acknowledgment signal indicating a reserved address has been addressed, the input of the decoding circuit coupled to the address bus, and the first decode output coupled to the data bus;

a final address register having a first input, a second input, a control input, and an output, for generating an address for a final host instruction of an emulation routine, the first input of the final address register coupled to the virtual counter generation circuit to receive the virtual program counter value, and the second input of the final address register coupled to the second decode output of the decoding circuit to receive the offset signal;

a comparison means having an first input, a second input and an output, for generating an execution complete signal when a signal at the first input of the comparison means is greater than another signal at the second input of the comparison means, the first input of the comparison means coupled to the virtual counter generation circuit to receive the virtual program counter value, the second input of the comparison means coupled to the output of the final address register; and a control circuit having a first input, a second input, a third input and a command output, for issuing a sequence of state control commands in response to signals from the decoding circuit and the comparison means, the first input of the control circuit coupled to the acknowledgment output of the decoding circuit, the second input of the control circuit coupled to the output of the comparison means, the third input of the control circuit coupled to the control bus, and the command output of the control circuit coupled to the control bus.

10. The apparatus of claim 9, wherein the decoding circuit is a digital decoder having a plurality of inputs, each of the inputs of the decoder coupled to a respective one of the lines forming the address bus, and wherein the address for the emulated program counter is predetermined, and the decoder output asserts the acknowledgment signal when the predetermined address is on the address bus.

11. The apparatus of claim 9 wherein the final address register comprises an adder and a register with outputs of the adder coupled to inputs of the register.

12. The apparatus of claim 9, wherein the comparison means is binary comparator having a plurality of first inputs and a plurality of second inputs.

13. The apparatus of claim 9, wherein the control circuit comprises combinational logic coupled to form a state machine that sequentially asserts signals for prefetching the next emulation routine pointer, the signals including: a NERP valid signal, a EPC load command, a first DMA read command, a load opcode command, a second DMA read command, and a load pointer command.

14. The apparatus of claim 9, wherein the control circuit comprises combinational logic coupled to form a state machine that sequentially asserts signals for a jump operation with the execution of an emulation routine, the signals including: the load data command, the increment control signal, the VPC update command, and the VPC output command.

15. The apparatus of claim 9, wherein the control circuit comprises combinational logic coupled to form a state machine that sequentially asserts signals to provide the next host instruction directly to the CPU, the signals including: the VPC output command, the NERP valid signal, the VPC NERP command, and the VPC update command.

16. The apparatus of claim 1, wherein the virtual counter generation circuit further comprises:

a jump increment storage means having a data input, a control input and an output 216, for storing an value by which the VPC value must be adjusted for a jump operation, the data input coupled to the data bus, the control input of the jump increment steerage means coupled to the control bus;

a signal selection means having a first data input, a second data input, a control input and an output for providing the appropriate value by adjust the VPC value, the first data input of the signal selection means coupled to the output of the jump increment storage means, the second data input of the signal selection means coupled to receive a constant, and the control input of the signal selection coupled to the an increment control output of the state machine;

a summing means having a first input, a second input and an output for adding the current VPC value to the output of the signal selection, the second input of the summing means coupled to the output of the first selection means; and a virtual program counter (VPC) having a control input, a first data input, a second data input, and an output for storing the virtual program counter value, the control input of the VPC coupled to the control bus, the first data input of the VPC coupled to the output of the summing means, the second data input of the VPC coupled to the output of the pointer storage means, the output of the VPC coupled to the first input of the summing means, the output of the VPC coupled to the address instruction bus.

17. The apparatus of claim 16, further comprising an output driver means having a data input, a control input, a first output, and a second output for selectively outputting the virtual program counter value to one from the group of the data bus and the instruction address bus, the data input coupled to the output of the VPC, the control input coupled to the control bus, the first output coupled to the data bus, and the second output coupled to the instruction address bus.

18. The apparatus of claim 16, wherein the summing means is an arithmetic logic unit capable of adding positive and negative values to the constant.

19. The apparatus of claim 16, wherein the VPC comprises a decoder, a multiplexor and a register.

20. A method for issuing instructions during the execution of emulation routines, each emulation routine comprising one or more host instructions, the method issuing the host instructions directly to a central processing unit (CPU) of a host computer system, the host computer system also having a memory, a control bus, a data bus, an address bus, and an address instruction bus, the method comprising the steps of:
fetching a first emulation routine pointer from the memory, the first emuilation routine pointer corresponding a first emulation routine;
loading the first emulation routine pointer into a virtual program counter determining if a next host instruction request has been made by the CPU;
outputting the VPC to the instruction address bus;
executing a host instruction located at the address output by the VPC using the CPU;
prefetching a next emulation routine pointer (NERP) concurrent with the execution of the host instructions of a current emulation routine;
determining whether the host instruction being executed is the final host instruction in the current emulation routine;
in the event that the host insturction being executed is not the final host instruction in the current emulation routine, performing the step of incrementing the VPC;
in the event that the host instruction being executed is the final host instruction in the current emulation routine, performing the step of loading the VPC with the NERP;
coupling an output of the VPC to the instruction address bus, and disconnecting a program counter of the CPU from the instruction address bus at a time prior to the execution of a first host instruction within the first emulation routine; and
disconnecting the output of the VPC from the instruction address bus, and coupling the program counter of the CPU to the instruction address bus at a time after a final emulation routine has been executed.

21. The method of claim 20, wherein the step of prefetching the next emulation routine pointer comprises the steps of:
retrieving a next source instruction from the memory using an address stored in an emulated program counter;
retrieving the next emulation routine pointer from the memory using the next source instruction retrieved; and
storing the pointer to the next emulation routine in a pointer storage means.

22. The method of claim 21, wherein the steps of retrieving the next source instruction and retrieving a pointer are direct memory access read operations; and wherein a plurality of bits of the next source instruction is used to indicate a memory location corresponding to the next emulation routine pointer.

23. The method of claim 21 further comprising the step of loading the opcode of the next source instruction into an opcode storage means after the step of retrieving the next source instruction from memory.

24. The method of claim 20 further comprising the steps of:
determining whether an exception has occurred during the execution of the instruction at the address output by the VPC; and
in the event that an exception has occurred, performing the additional steps of:
outputting the VPC on the data bus;
asserting a dedicated address on the address bus; and
storing the VPC at the dedicated address.

25. The method of claim 20 further comprising the step of
determining whether a reference to a reserved address has occurred during the execution of the instruction at the address output by the VPC.

26. The method of claim 20 further comprising the steps of:
determining whether a reference to a dedicated address has occurred during the execution of the instruction at the address output by the VPC; and
in the event that a reference to a dedicated address has occurred, performing the additional steps of:
retrieving a jump increment from the data bus;
updating the VPC with the jump increment retrieved from the data bus;
outputting the VPC to the instruction address bus; and
updating the VPC.

* * * * *